Sept. 24, 1935.  F. W. JACKMAN  2,015,272
COMPOSITE MOTION PICTURE
Filed May 6, 1931
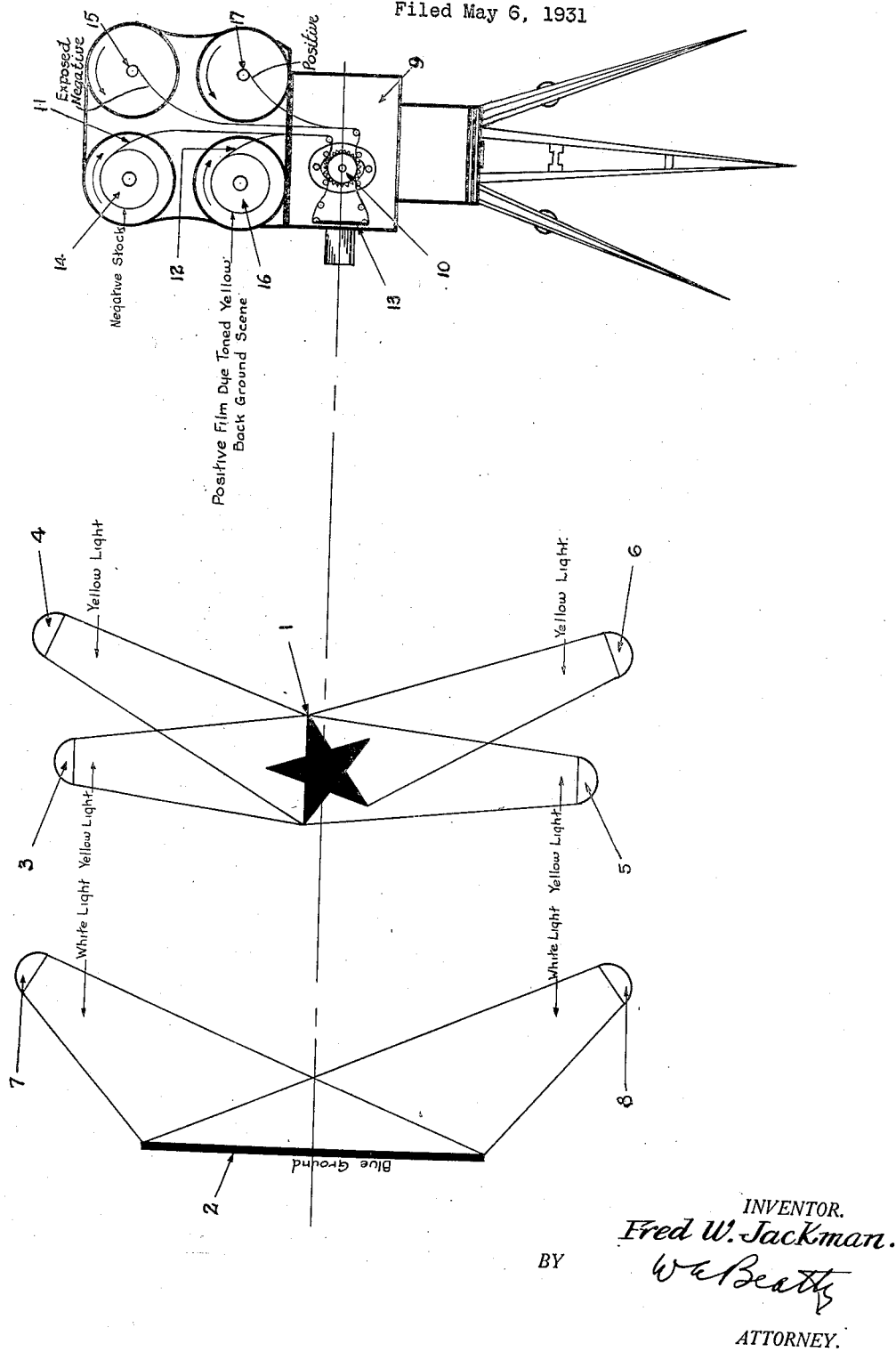
INVENTOR.
Fred W. Jackman.
BY
ATTORNEY.

Patented Sept. 24, 1935

2,015,272

UNITED STATES PATENT OFFICE 2,015,272

COMPOSITE MOTION PICTURES

Fred W. Jackman, Beverly Hills, Calif., assignor to Warner Bros. Pictures, Inc., New York, N. Y., a corporation of Delaware Application May 6, 1931, Serial No. 535,506

3 Claims. (Cl. 88—16)

This invention relates to composite motion pictures wherein a background scene and a foreground or action component are photographed at different times and later photographically superposed from a single point of view and in a single step or operation to produce the final composite picture.

The embodiment chosen to illustrate the invention depends upon color separation for combining the component parts of the picture into the composite picture. That is to say, the action, such as actors or the like, is illuminated with light of a selected color before a ground or canvas drop which emits light of another color. The camera contains a background scene dye-toned the same color as the light employed for illuminating the action. This background scene, usually in the form of a transparency, is placed in the camera before the negative film which is to carry the composite picture exposure. Various other processes depending on color separation have also been proposed for making composite pictures.

It has heretofore been proposed to carry out such processes with blue light on the action, the ground being red and illuminated with red light. I have discovered that this has several defects, among which are: (1) frequent renewal of the red filters used in front of the arc lights to give a source of red light, these renewals being necessary due to fading or cracking of the filters under the intense light and heat to which they are subjected by the arc; (2) small lighting efficiency as only a small part of the arc light reaches the ground as red light.

An object of the present invention is to avoid the defects above noted. This is accomplished by providing a ground in a solid color, and in illuminating that ground with white light. This saves the expense of the filters and makes it possible to obtain a given intensity of illumination of the ground with less consumption of electrical power than heretofore.

For further details of the invention, reference may be made to the drawing, in which the figure represents diagrammatically apparatus for photographing composite pictures in a single step or operation.

Referring to the drawing, the action 1 (which may be actors or the like) is positioned about 15 ft. in front of a ground 2. The action 1 is illuminated with yellow light by the lamps 3, 4, 5 and 6, and the ground 2 reflects a complementary color—ultramarine blue. The ground 2 may consist of a sheet of canvas dyed ultramarine blue and illuminated with white light by the lamps 7 and 8.

The use of ultramarine blue and yellow as complementary colors has certain advantages described and claimed in my co-pending application Serial No. 535,505, filed May 6, 1931.

The lamps 7 and 8 are so arranged that they do not directly illuminate the action 1, and the lamps 3, 4, 5 and 6 are so arranged that they do not illuminate the ground 2.

The action 1 is photographed before the ground when arranged as described, by means of the camera 9 containing a sprocket 10 for feeding the films 11 and 12 through the film gate 13. The film 11 is panchromatic negative stock and is taken from the supply reel 14 and wound up on the take-up reel 15. The film 12 is a positive film of the desired background scene which has been dye-toned yellow, the same color as that employed to illuminate the action 1. By "dye-toned" I mean that the silver deposit of the image is replaced with dye. The film 12 is taken from the supply reel 16 and taken up on the take-up reel 17. Preferably, the films 11 and 12 are so positioned on the reels that their emulsion faces are in contact in passing through the film gate 13.

It is necessary to modify certain of the cameras now on the market in order that they may be adapted for the purpose above described. For instance, it is necessary with some cameras to increase the depth of the film channel in the film gate in order that it may accommodate two films instead of one. Furthermore, the final negative being removed from the lens the thickness of a film, it is necessary to move the ground glass of the view-finder away from the lens a corresponding distance in order that the ground glass may be positioned at the same distance from the lens as the negative film. This may be conveniently done by inserting in front of the ground glass a shim, or thin piece of metal, the thickness of the film 13.

The yellow light reflected from the action 1 passes substantially unimpeded through the yellow background scene on the film 12 and impresses its image on the negative film 11. The action 1 intercepts the light immediately behind it and reflected from the ground 2. The light reflected from the remainder of the ground 2 serves to print on the negative film 11 that part of the background scene where the image of the action 1 does not exist.

It will be apparent, therefore, that the invention provides for photographing composite motion pictures in a single step or operation.

It will be apparent to those skilled in the art that various modifications within the scope of my invention may be made.

I claim:

1. An arrangement for photographically combining on one negative film a foreground action scene and a previously photographed background scene, said arrangement comprising a motion picture camera wherein the negative film is exposed to incoming light which first traverses a colored transparency of the background scene, said transparency having the same color value throughout, said camera comprising means for traversing said negative film and said transparency at the same speed, a background situated in the field of view of said camera, an opaque action disposed between said camera and said background, means for illuminating said action with light of substantially the same color as that of said transparency, said background being of a color which is substantially complementary to the color of said transparency, and means for illuminating said background with unfiltered light, including light of the color of the background.

2. An arrangement for photographically combining on one negative film a foreground action scene, and a previously photographed background scene, said arrangement comprising a motion picture camera wherein the negative film is exposed to incoming light which first traverses a colored transparency of the background scene, said transparency having the same color value throughout, said camera comprising means for traversing said negative film and said transparency at the same speed, a background situated in the field of view of said camera, an opaque action disposed between said camera and said background, means for illuminating said action with light of substantially the same color as that of said transparency, said background being of a color which is substantially complementary to the color of said transparency and means for illuminating said background with white light.

3. The method of making composite motion pictures which comprises moving a light sensitive motion picture film with a background transparency motion picture film in front thereof, at the same speed across the exposure aperture of a motion picture camera, said transparency having the same color value throughout, and light exposing said films to an opaque action before a ground of a color complementary to the color of said transparency, while illuminating said action with light of substantially the same color as the color of said transparency, and while illuminating said ground with white light.

FRED W. JACKMAN.